UNITED STATES PATENT OFFICE

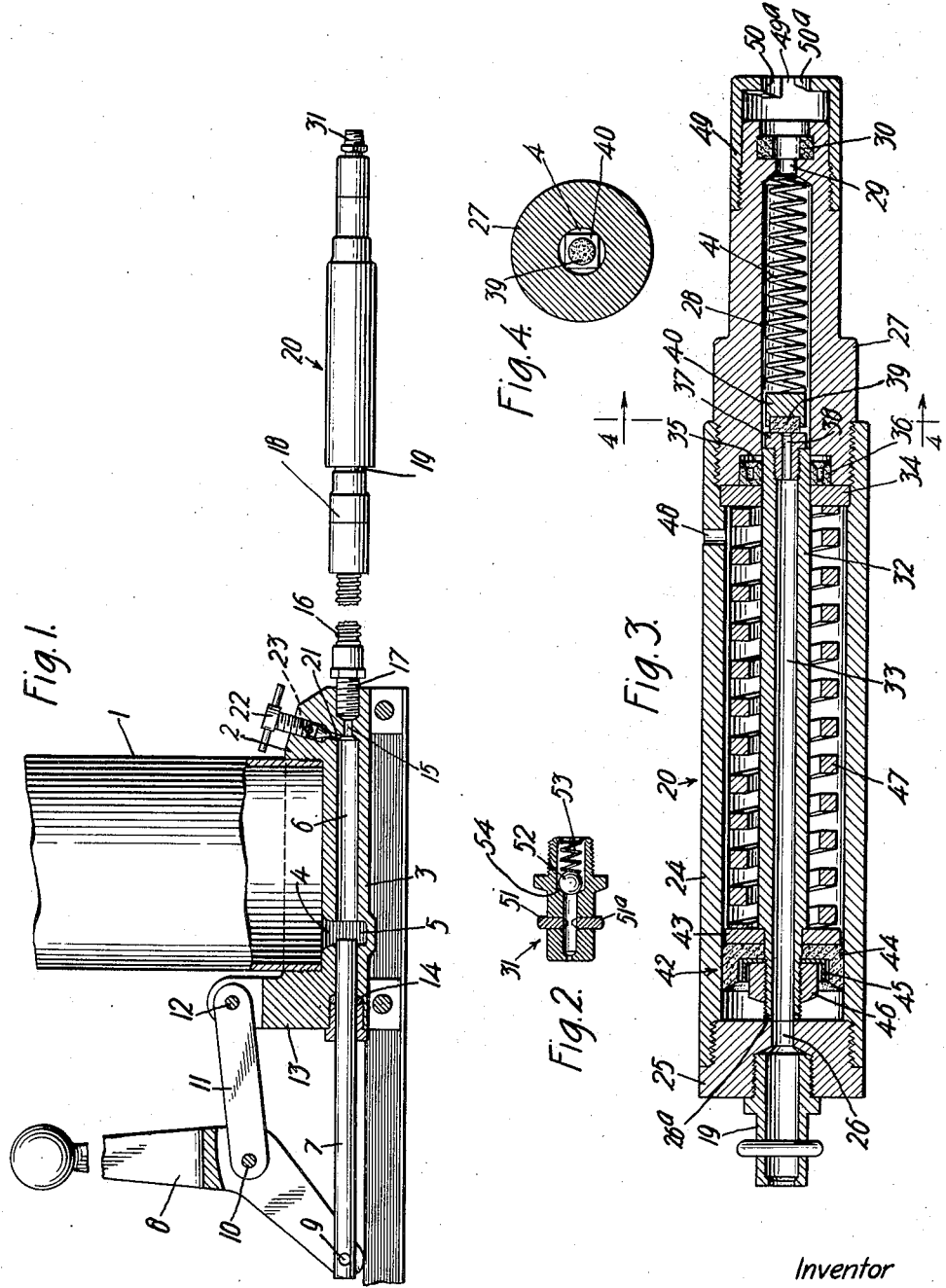

HERMAN ALBERTINE, OF EAST RUTHERFORD, NEW JERSEY, ASSIGNOR TO ROGERS PRODUCTS CO., INC., A CORPORATION OF NEW JERSEY

BOOSTER-LUBRICATING APPARATUS

Application filed November 23, 1927. Serial No. 235,150.

My present invention is embodied in an apparatus designed to supply oil or grease to bearings through fittings, which are used in place of grease cups in accordance with the lubricating system described in British patent to Alley, et al., No. 21,893 of 1908. The fittings, such as are used in said lubricating system, or ducts leading from the fittings to the bearings, particularly on automobiles, trucks, etc., frequently become clogged with dirt, hardened lubricant, etc., to such an extent that it is impossible to force grease or even oil therethrough by any of the force-feed lubricators or grease guns now available for the purpose. On the other hand, there are special cold weather conditions or ordinary grease where such lubricant is too viscous and there are special kinds of grease that are too sticky for use in any known force-feed devices.

I have discovered, however, that in actual practice, clogged grease ducts can be blown clear in almost all cases by forcing in grease under pressure in the neighborhood of 10,000 to 30,000 pounds per square inch. While much higher pressures are easily attainable by my apparatus, actual experience seems to show that most clogged ducts blow through within the above range unless positively closed as by a fragment of stone or metal large enough or hard enough to require drilling.

The apparatus which I have devised enables perfect handling of ordinary clogged grease or specially sticky grease and comprises, preferably, a valveless pump in which the pump cylinder inlet is opened and closed by the pump piston and a booster or pressure multiplying device connected with the pump cylinder outlet without the interposition of check valves and adapted for ready connection to or disconnection from a nipple having a check valve and preferably forming part of a lubricating system for supplying grease or oil to bearing surfaces of a machine.

An advantage of my apparatus is that it comprises a plunger pump of small diameter and correspondingly high power, actuated by leverage means of high multiplying rates. Preferably the pump is connected by a flexible conduit with a pressure multiplying device that is directly connected to the grease receiving nipple or duct. Thus the pressure ultimately available may be much greater than could be safely carried by the flexible conduit.

With my valveless pump, the cylinder outlet is preferably somewhat constricted so that by a succession of quick return and slow forward strokes the pressure may be built up very materially. By a slow return or suction stroke by which the plunger is moved to its rearmost position, the grease is enabled to ooze back quickly through the constriction and release the pressure in the hose.

The pressure multiplying device or booster preferably includes a motor cylinder and differential piston into which grease is forced by the pump. The piston is normally held against the pressure of the grease, by means of a heavy spring so that the piston remains stationary and functions merely as a wall of the reservoir until the pressure of the grease is sufficient to compress the spring. Said motor piston is provided with a central opening and a hollow pump plunger projecting forwardly from said opening and in telescoping relation with a member which leads to a coupling whereby it may be secured to the device to be lubricated. This hollow plunger or secondary piston is provided with a spring pressed check valve and when the resistance or back-pressure in the duct to be lubricated is not too high, the grease will be forced directly through the hollow plunger and check valve without moving the piston against the action of the heavy spring. In the event, however, that the resistance to be overcome is very great, the pressure piles up on the main or motor piston, and when it becomes sufficient to compress the spring, the motor piston is driven forward, forcing the hollow plunger forwardly with respect to the pump cylinder in which it is telescoped. Thereupon the check valve closes and the confined grease has applied through a small piston area all the pressure exerted on the much greater area of the motor piston. The effective multiplication of power is, of course, diminished somewhat by the pressure required to overcome the resistance of the spring.

When the pressure from the primary or reservoir pump is released, the motor piston is returned to its initial position by the spring, the grease then flowing freely through the check valve and the hollow plunger to refill the space left by retreat of the latter, thus supplying additional grease to be forced into the fitting upon subsequent actuation of the primary or reservoir pump. Due to the use of a fixed check valve in the nipple of the fitting and the omission of such a fixed check valve in the force-feed apparatus, the pressure at the coupling between the booster and the fitting may be relieved to permit detachment from the booster or fitting merely by retraction of the primary pump plunger.

The pump forming part of this apparatus may be similar to the pump disclosed and claimed in my co-pending application for high power grease gun Ser. No. 190,726, filed May 12, 1927, and the booster may be similar in certain respects to the apparatus disclosed and claimed in my co-pending application Ser. No. 80,139, filed January 9, 1926, which has matured in Patent 1,733,356, dated June 21, 1927.

The above and other features of my invention may be more fully understood from the following description in connection with the accompanying drawings, in which Fig. 1 is a side elevation, partly broken away, of one embodiment of my invention;

Fig. 2 is a longitudinal section illustrating one form of nipple;

Fig. 3 is a longitudinal section of the booster or device for automatically multiplying pressure; and Fig. 4 is a view taken in section on the line 4—4 of Fig. 3.

In the embodiment of the invention shown in Figs. 1 to 4, a grease reservoir comprising a cylinder, is shown as screwed into an annular collar 2 integral with a suitable base 3. The cylinder may conveniently be a drawn steel tube, say 3" internal diameter with ⅛" walls and 18" long. The grease in said cylinder may normally be pressed downwardly by means, such for example as disclosed in said co-pending application No. 190,726, towards an inlet port 4 to a passage 5 extending completely around a cylinder 6 which is preferably formed integral with the base 3.

Sliding in the cylinder 6 is a rod plunger or piston 7 which is operated by a lever 8 through a pivot 9, the lever 8 being fulcrumed on a pivot 10 at the end of a link 11 connected by a pivot 12 with an upper projection 13 of the base 3. It will be evident that this connection is such that a very powerful toggle-like action on the plunger 7 may be effected by the lever 8, the lever or handle 8 assuming a substantially horizontal position at the end of its stroke so that it may conveniently be pressed down by the foot. Preferably the base 3 is made with a base area amply sufficient for stable support enabling more stress to be applied to the handle 8 in operating the plunger 7. A tight fit for the plunger 7 in the base 3 may be effected by use of a packing ring 14 forced into a packing recess by a packing nut or gland screwed into said recess.

In a working stroke of the plunger 7, the grease which has entered the pump cylinder is pressed forwardly through a reduced or constricted passage 15 to a flexible conduit or hose 16 provided with a nipple 17 to be screwed into the base 3. The conduit 16 may be a flexible metal hose adapted to sustain very high internal pressure and provided at its outer end with a fitting 18 for detachable connection with a nipple 19 on a booster or pressure multiplying device 20. The more constricted the bore or passage 15, the slower the forward stroke is likely to be, but the return strokes may be made very quickly and new forward strokes begun before the grease can flow back and reduce materially the pressure in the hose. Consequently, considerable pressure may be built up by a few quick strokes prior to the final maximum effort on the toggle.

At its outer end, the pump cylinder 6 communicates through a priming outlet or vent 21 to a bore in which is screwed a plug 22 having a reduced inner end terminating at a conical point normally projecting into the outer end of the passage 21 and serving to regulate communication with an opening 23 through which air may be vented to improve the operation of the pump or lubricant may be vented to relieve the pressure in the hose when required.

The booster or pressure-multiplying device is shown as comprising a cylinder 24 detachably secured, as by screw-threads, to an end 25 carrying the nipple 19 and having a small or restricted central opening 26 through which lubricant passes from the nipple 19 into said cylinder and to a member 27 having a longitudinal cylindrical passage 28 communicating at one end with the interior of the cylinder 24 and at the other end with a restricted passage 29 communicating with a recess containing a packing ring 30 for engagement by the end of a nipple 31 which may be locked to the booster by suitable means to be described hereinafter.

The portion of the member 27 which includes the cylindrical passage 28 forms a cylinder in which is slidably mounted a rod or piston 32 having a longitudinal passage 33 extending from end to end thereof. The passage 32 passes at the rear end of the member 27 through a metal washer or ring 34 which is held against an annular shoulder in a cylinder 24 by the rear end of the member 27 when screwed into the forward end of said cylinder 24. The member 27 is also provided at its rear end with an annular recess 35 to receive a packing ring 36 of U-shaped cross section which fits closely around the piston 32. It will be seen that the packing ring 36 which preferably is of leather serves to prevent any substantially rearward leakage from the cylindrical passage 28 around the passage 32. At its forward end the piston 32 is provided with an internal screw thread for receiving the threaded inner end of a member 37 having a head overlying the forward end of the piston 32 and having a restricted passage 38 through which lubricant passes from the central passage 33 of the piston into the cylindrical passage 38 of the member 27. Preferably, lubricant in the cylindrical passage 28 is prevented from moving back into the passages 38 and 33 by a check valve comprising a member 39 of suitable packing material mounted in the rear face of a member 40, slidable in the cylindrical passage 28. This member 40 may be of such cross-section, square, for example, as to permit the lubricant to be forced around the same and forwardly along the said passage 28. The member 40 is urged to hold the packing member 39 in engagement with the member 37 by a spring 41 interposed between the member 40 and the shoulder portion of the member 27 around the restricted passage 29. This spring 41 serves only to urge the valve to closed position and no very great strength of spring is necessary. At its inlet end, the piston 32 carries a piston 42 which has a sliding fit in the cylinder 24. As here shown, the piston 32 has a reduced inlet end on which are supported the various parts of the piston 42 comprising a metal washer 43 resting against an annular shoulder at the forward end of the reduced portion, a cup shaped washer 44 of suitable material such as leather, a metal cup 45 inside said washer 44 to hold it in position, and a nut 48 screwed on the threaded outer end of said reduced portion of the piston 32 and engaging the bottom of the cup 45 to hold the leather washer 44 in engagement with the metal washer 43. It will be evident that the cup shaped leather washer 44 acts very effectively to prevent leakage of the lubricant past the piston 42. The pistons 42 and 32 are urged to their rearward positions as shown in Fig. 3 by a strong helical spring 47 of wire or strip material here shown as of rectangular cross section. This spring is of such strength that about 1,000 pounds pressure is required for operating it. The cylinder 24 is provided with a vent 48 to permit the passage from the cylinder 24 of any lubricant leaking past the washers 36 and 44, thereby preventing interference with the operation by lubricant accumulating between the metal washers 43 and 34.

For detachably securing the nipple 31 to the member 27, there is provided a sleeve 49 secured to the member 27, as by screw threads, and formed at its open forward end with internal elements 50 and $50^a$ having screw surfaces and each comprising nearly a half turn of what is in effect a double thread screw. The double thread screw elements 50 and $50^a$ respectively, engage projections 51 and $51^a$ on the exterior of the cylindrical nipple 31. The recess containing the packing ring 30 and the registering opening in the member 27 are of proper size for loose fit of the end of said nipple 31 while the slots $49^a$, separating the screw elements 50 and $50^a$, are of proper width to receive the projections 51 and $51^a$. The head being applied to the nipple so as to bring said projections within range of the screw elements 50 and $50^a$, and the end of the nipple in contact with the front face of the washer or packing 30, the head is rotated sufficiently to compress the packing ring or washer 30 between the end of the nipple and the bottom of the recess.

In practice, much less than a half turn of a screw of the pitch shown is found sufficient to compress the washer, take up for wear and make a tight joint under all conditions of use. In cases where the thread is so steep as to cause danger of slip and unscrewing, the engaging screw surfaces may be roughened as shown.

The nipple 31 is formed at its rear with a relatively large diameter part of the grease passage to house the valve ball 52 which is urged to closing position by a spring 53. Inasmuch as the valve-ball-housing part is at the rear end of the nipple which screws into the solid metal of the part to be lubricated, the valve seat 54 may be made broad and the walls of the outer end may be made as thick as required. In nipples in which the ball is held in position at the outer end merely by a flimsy inturned flange, the flange will be straightened and the ball forced out at pressures of, for example, 2,000 to 4,000 pounds pressure. With applicant's nipple, pressures above 30,000 pounds per square inch will be sustained without damage.

Furthermore, this construction renders possible the small diameter of the inlet passage to the ball. The nipple just described is disclosed and claimed in my copending application Ser. No. 189,210, filed May 6, 1927. It should be understood that the nipple 19 may be substantially the same as nipple 31, but with the valve ball and spring omitted.

In operation, as the handle of the gun or pump is swung down, grease is forced through the hose 16 into the primary cylinder or low pressure chamber of the booster and at ordinary working pressures passes through the piston plunger 32 past the check valve and through the secondary cylinder to the nipple. When, however, the pressure to be overcome is greater than that required to compress the spring 47, for example, 1,000 pounds, operation of the handle 8 of the gun forces the grease through the notches 26ª into the booster low pressure chamber and advances the piston 42 as far as it has to go to accommodate one pump full of grease. Upon briskly reciprocating the handle of the pump, a full stroke of the piston may be forced. When slowly retracted, the spring 47 has time to force the grease back into the gun through the restriction 15, shoving the handle 8 up. When the pump piston is quickly reciprocated to drive the booster forward, a greater pressure develops in the chamber of the secondary cylinder due to the fact that the grease becomes more solidly packed therein. After each compression of the spring 47, part of the grease in the low pressure chamber at the rear of the booster is forced through the hollow plunger into the passage 41 of the secondary cylinder against the pressure of the spring 41.

In forcing grease or lubricant to the nipple 31 against resistance higher than 1,000 pounds per square inch, the handle 8 after each depression is returned quickly for starting each new forcing operation thereof, thus enabling successive increments of grease to be forced into the low pressure chamber of the booster. When, however, the handle 8 is returned slowly, the grease will be forced back into the cylinder 6, thus relieving the pressure in the low pressure chamber of the booster. The ratio of the internal diameter of the secondary cylinder to the diameter of the primary cylinder is about 1 to 6.75 and the loss due to the strength of the spring 41 is sufficient to change the power ratio to substantially 1 to 6. A pump pressure of 4,000 pounds will, therefore, enable a pressure of 24,000 pounds per square inch to be exerted at the nipple. The gun or pump here disclosed is of relatively large volume and requires approximately 36 strokes to a pound of grease and is effective for working the booster, other types of guns now in the market and requiring 166 to 200 strokes to a pound of grease being ineffective for this purpose.

I claim:

1. In combination, a pressure multiplying device adapted to be attached to the one-way valved inlet nipple of a grease conduit, said device including a motive cylinder to receive lubricant under pressure, a motive piston in said cylinder having a passage therethrough, a driven piston of smaller cross-section attached to the motive piston and having a passage therethrough forming a continuation of the passage through the motive piston, a force pump cylinder in which the driven piston works, a check valve for said through-passages and spring means normally holding said pistons in rearward position so that against low pressures the lubricant is forced through said passages and into said nipple without moving the pistons and against high pressures lubricant is forced under pressure against the larger motive piston and exerts a higher pressure per unit area at the smaller driven piston and upon relief of said pressure against the large piston the pistons are forced back by the spring means and lubricant forced through the check valve for said pistons; a reciprocating pump of the solid plunger type operating to force lubricant against the rear face of the larger piston by alternate application and release of pressure, said pump having a valveless discharge outlet of restricted cross-section small enough to retard return of the lubricant, and prevent substantial restoration of said motive piston during rapid reciprocation of the pump piston whereby rapid reciprocation builds up pressure in the motive cylinder and release or slow rearward movements of the pump piston permit substantial rearward flow and release of said pressure.

2. A lubricating system including a pressure-multiplying device having a movable piston of relatively large area between the grease at the inlet end and the gun outlet and subject to pressure exerted on said grease, means normally tending to sustain the said piston against the pressure of said grease under the moderate pressures required to force-feed the grease against ordinary working resistance but adapted to yield when greater pressures are applied against greater resistances, relatively small area piston and cylinder pump elements, one carried by and communicating with the pressure side of the larger piston and the other rigidly connected to and discharging grease through the grease gun outlet, and a forwardly opening check valve for said passage to open and permit through flow of grease under the primary pressure when the larger piston is sustained against said pressure and to close to prevent reverse flow of grease through said passage when said larger piston yields and causes a forcing stroke of the pump element carried thereby; and a valveless reciprocating pump connected with the inlet end of said pressure-multiplying means by a highly restricted passage adapted when operated with rapid rearward strokes to force successive charges of grease into the inlet end of said power multiplying means and when operated with slow rearward strokes to relieve the pressure on the larger piston of the power multiplying means to enable the return thereof to its rearward position and the movement of additional grease through said check valve toward the outlet end of said power multiplying means.

3. A lubricating system adapted to supply grease to a duct having a valved inlet fitting, said system including means to automatically multiply the pressure of the grease delivered to said duct when abnormal back pressure occurs in the duct, the system including a source of grease under pressure, a pump for passing such grease to the inlet of the pressure multiplying means and a fitting at the outlet of the pressure multiplying means for attachment to the end of the duct to be lubricated, the pump being of the plunger type with a plunger controlled inlet port and a restricted valveless outlet port whereby upon rapid reciprocation of the plunger high pressures may be built up beyond the outlet port due to the retardation of pressure-relieving back-flow caused by the restricted area of the port.

Signed at New York city in the county of New York and State of New York, this 22nd day of November, A. D. 1927.

HERMAN ALBERTINE.